Feb. 14, 1933.  J. R. NOLAN  1,897,070
MECHANISM FOR FEEDING CLOTHESPINS
Original Filed Feb. 20, 1929   4 Sheets-Sheet 3

Inventor
John R. Nolan

Feb. 14, 1933.   J. R. NOLAN   1,897,070
MECHANISM FOR FEEDING CLOTHESPINS
Original Filed Feb. 20, 1929   4 Sheets-Sheet 4
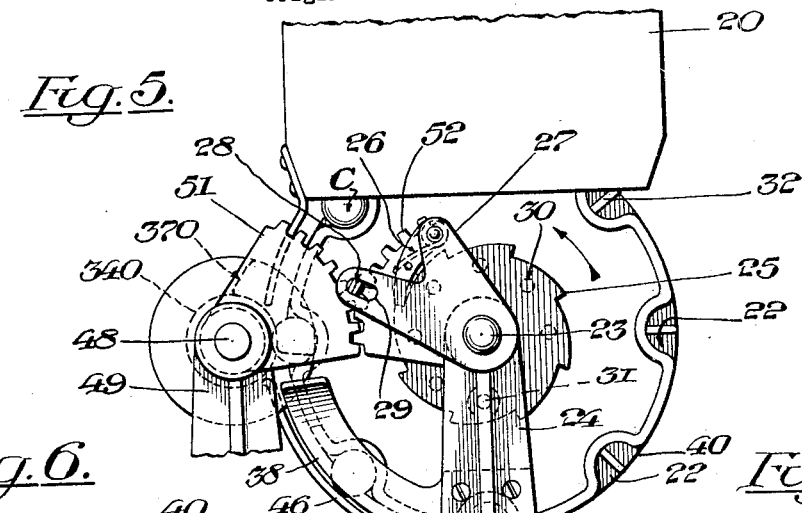
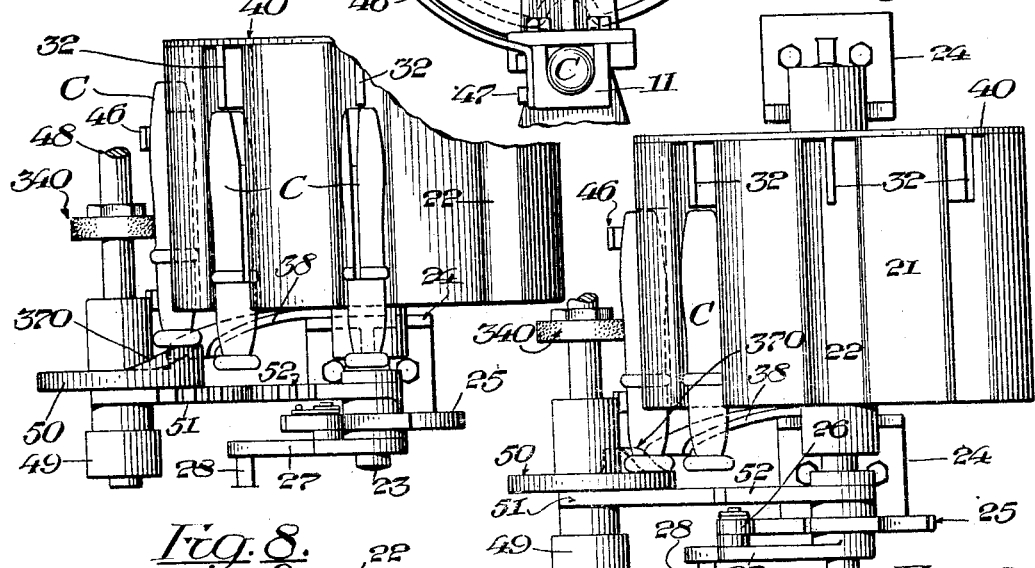
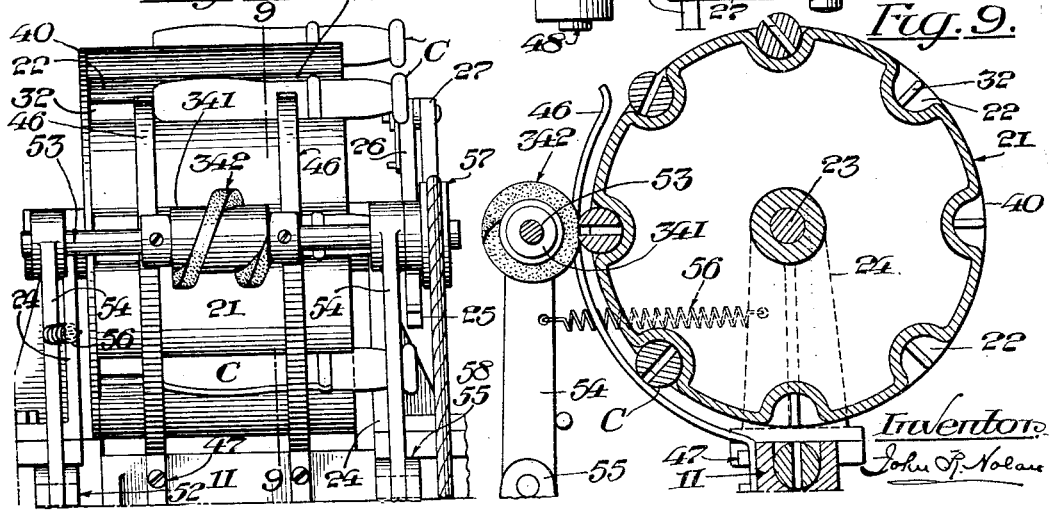

Patented Feb. 14, 1933

1,897,070

UNITED STATES PATENT OFFICE

JOHN R. NOLAN, OF NEW YORK, N. Y.

MECHANISM FOR FEEDING CLOTHESPINS

Refiled for abandoned application Serial No. 341,355, filed February 20, 1929. This application filed March 20, 1930. Serial No. 437,586.

This invention relates to means for transferring forked clothespins from a hopper, or other source of supply, to a suitable receiving station in such a manner that the clothespins are positioned at the station with the transverse slot of each succeeding pin occupying a definite plane radially of the pin.

The invention has been especially, though not exclusively, designed for use in connection with the receiving station of a machine for applying reinforcing wire to clothespins, such, for example, as disclosed in Patent No. 1,799,698, dated April 7, 1931, wherein a skeleton hopper to which the clothespins are manually supplied in superposed relation, is employed, said hopper overlying the receiving station and having a vertically-disposed blade effective to guide the bifurcated ends of the clothespins in their descent and ensure their proper delivery to the station.

The principal object of my present invention is automatically to transfer succeeding clothespins from a suitable source of supply to the receiving station of the machine with the slots of the respective pins uniformly positioned for delivery to the wire applying devices.

With this object in view, and others which will appear, my invention embodies novel elements and combinations which will be hereinafter described; the scope of the invention then being defined in the appended claims.

In the drawings—

Fig. 5 is a similar view of a modified form of the feeding mechanism, showing the parts in the relative positions which they occupy when a clothespin has been moved into registry with a positioning blade on an intermittently rotatable transfer wheel.

Fig. 6 is a partial plan of the modified mechanism shown in Fig. 5.

Fig. 7 is a plan of the parts in their relative positions immediately before the clothespin has been engaged with the positioning blade.

Fig. 8 is a side elevation of another modified form of feeding mechanism wherein a spirally-ribbed roll is employed to advance each succeeding clothespin into registry with its opposing blade.

Fig. 9 is a transverse vertical section, as on the line 9—9 of Fig. 8.

Figure 1:
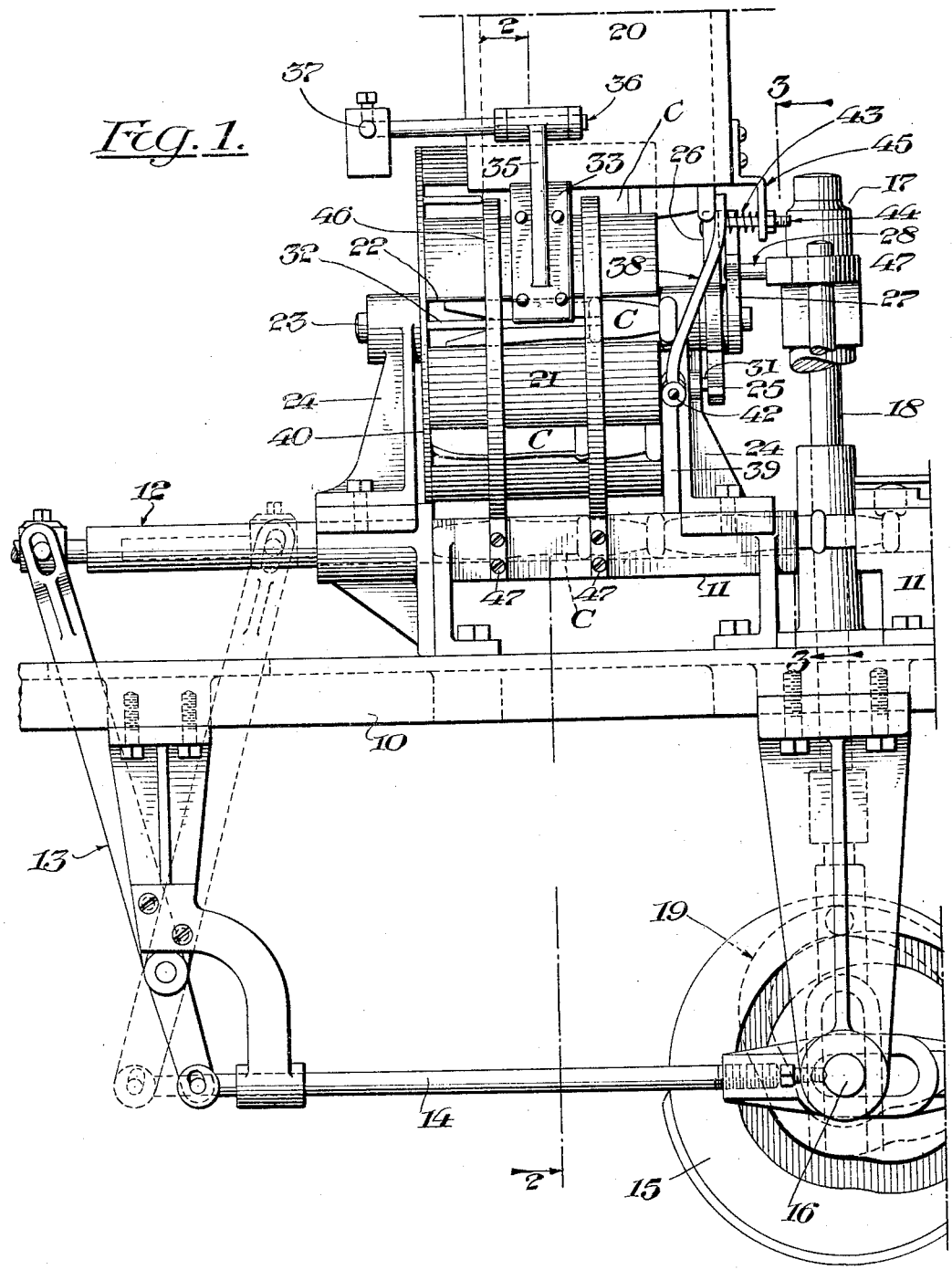
Figure 1 is a side elevation of a portion of a clothespin reinforcing machine equipped with a form of clothespin feeding mechanism embodying the principle of my invention.
Figure 2:
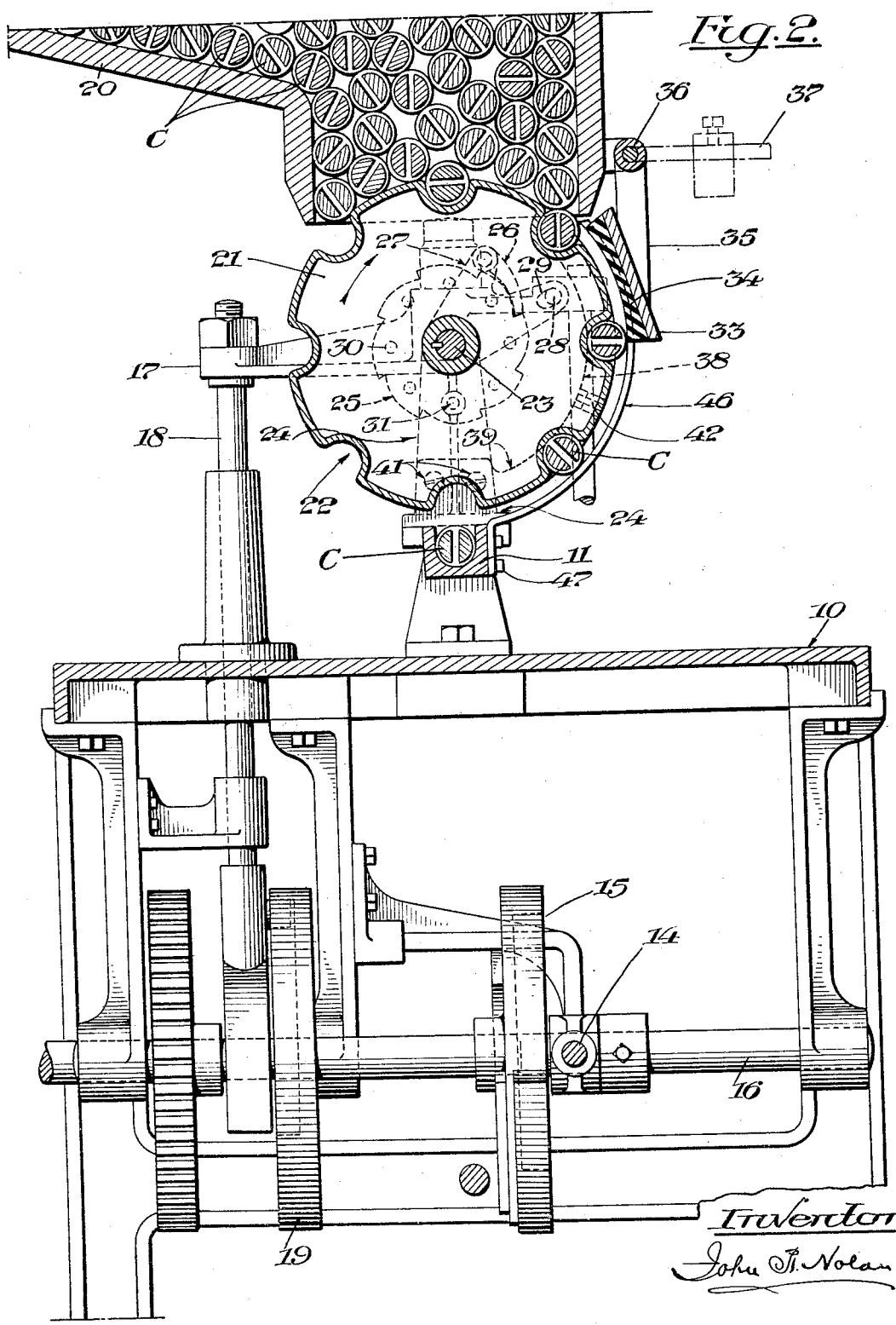
Fig. 2 is a transverse vertical section of the machine, as on the line 2—2 of Fig. 1.
Figure 3:
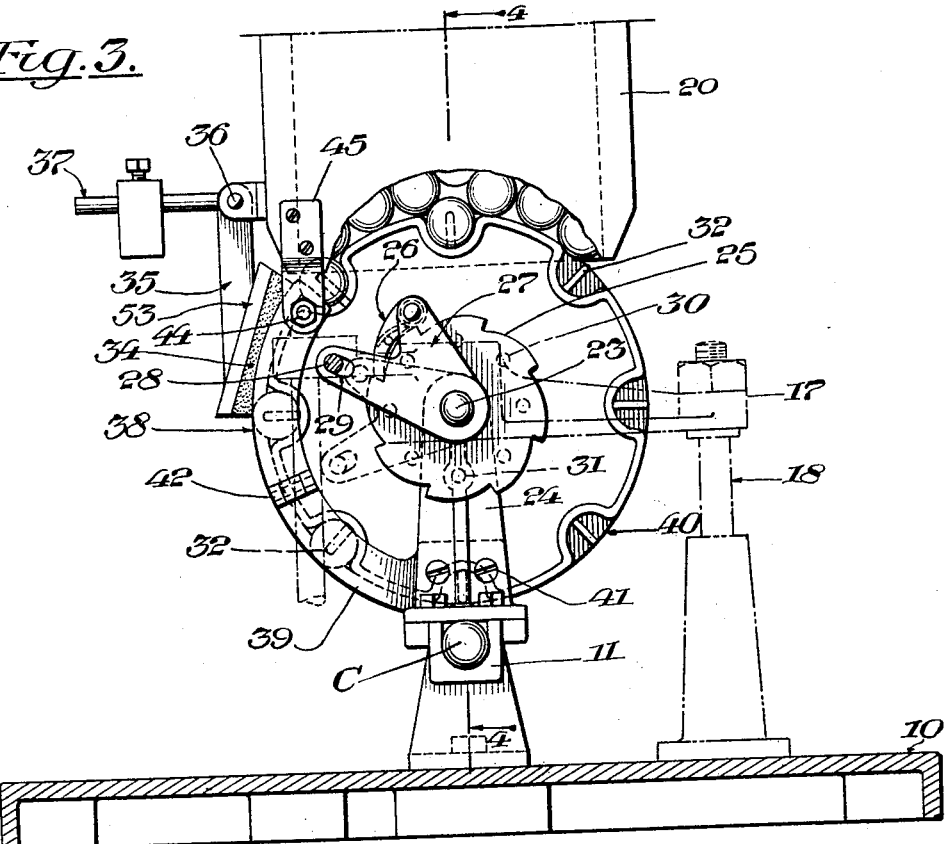
Fig. 3 is a transverse section, as on the line 3—3 of Fig. 1, a part of the hopper wall being broken away.

Referring to the drawings, 10 designates the bed of a form of clothespin reinforcing machine selected to illustrate my invention. 11 designates an elongated guide structure comprising two aligning channel or trough-like sections supported on and longitudinally of the bed. This structure is adapted to be supplied at one end thereof with succeeding clothespins (C) extending longitudinally of and parallel to the structure, which clothespins are intermittently advanced end to end along the structure to a station where reinforcing wire is applied to each succeeding pin adjacent the crotch of its legs. In the present instance, the clothespins, as and when they are successively positioned in the guide structure, are advanced by a horizontally reciprocating plunger 12 which is connected to the upper end of a vertical lever 13, the lower end of which is operatively connected by means of a rod 14 with a cam 15 on the main shaft 16 of the machine. The mechanism for applying the wire includes a vertically-reciprocative head 17 which is carried by a vertical plunger 18 under the control of a cam 19 on the main shaft, all as fully described in the pending application aforesaid.

20 designates a clothespin source of supply which in the form illustrated comprises a magazine or hopper supported a suitable distance above the receiving end of the guide structure. This hopper is constructed and adapted to contain a mass of clothespins arranged in parallelism, or substantially so, to the guide structure and with their bifurcated ends extending in the same direction.

Figure 4:
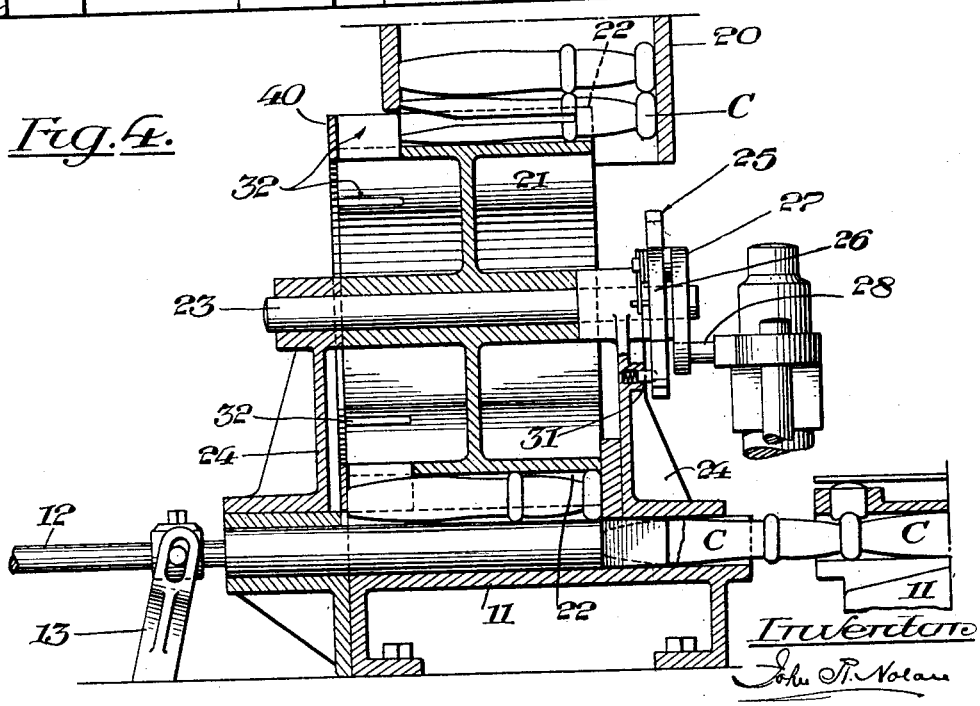
Fig. 4 is a sectional elevation of the feeding mechanism, as on the line 4—4 of Fig. 3.

21 designates a transfer element interposed between the throat of the hopper and the top of the guide structure, which element is adapted to convey the clothespins successively from the hopper to said structure in such a manner that when the clothespins are delivered to the latter their legs are correspondingly located as respects the plane of the slots between the legs of the respective pins. Hence the pins are successively advanced by the plunger 12 with their slots in alignment. In the form herein illustrated this transfer element comprises a wheel or drum having its axis of rotation directly above and parallel to the guide structure, the periphery of the wheel being formed with equally spaced grooves 22 which are parallel to its axis of rotation and are adapted to be successively supplied with the superposed clothespins as the grooves progress beneath the hopper. The wheel, which is substantially as long as a clothespin, is so arranged in relation to the hopper that one end of the wheel extends somewhat beyond the side of the hopper where the forked ends of the pins are situated, and consequently the opposite end of the wheel is spaced inwardly from the other side of the hopper, as seen in Fig. 4.

In the present instance the transfer wheel is fast on a shaft 23 having its bearings in suitably-disposed standards 24 on the guide structure. The end of the shaft adjacent the vertically reciprocative head 17 is extended and the extension is provided with a ratchet wheel 25 with the teeth of which engages a pawl 26 on a rock arm 27 loose on the shaft. A pin 28 projects from the head 17 into an opening 29 in the rock-arm, and hence during each reciprocation of the head the rock arm is oscillated in a vertical arc, thereby causing the pawl to actuate the ratchet wheel and correspondingly move the transfer wheel. The parts just described are so proportioned and timed that each step of the ratchet wheel is effected during the descent of the head 17; that the peripheral travel of the transfer wheel is equal to the distance between two adjacent grooves, and that in each dwell of the wheel a groove is located at the bottom of the wheel and immediately above and parallel to the guide structure. In the ascent of the head 17 and the pawl bearing rocker arm 27 the ratchet wheel is at rest. Other suitable means for actuating the transfer wheel may be employed. Preferably the inner face of the ratchet wheel is provided, concentrically therewith, with suitably-spaced sockets 30 which, in the successive movements of the ratchet wheel, are engaged by a spring-pressed stud 31 mounted in the adjacent standard 24, thus ensuring the accurate position of the ratchet wheel and also temporarily holding it at rest.

The end of each groove of the transfer wheel adjacent the forked extremity of its contained clothespin, is provided with a radial projection or positioning member, such, for example, as a blade 32, which is of such width that the clothespin, when properly seated in the groove, can be moved longitudinally of the latter to cause the legs of the pin to embrace the projection. In that case the pin is supported with the transverse plane of its slot positioned radially of the wheel, and, in consequence, as each succeeding groove with its contained pin is located at the bottom of the wheel, the horizontal pin, with the transverse walls of its slot vertically-disposed, drops into the guide structure.

When the clothespins enter the succeeding grooves of the transfer wheel passing under the throat of the hopper, the transverse walls of the slots of the clothespins are in various angular positions with relation to the bodies of the respective clothespins, in consequence of which some of the clothespins may be in proper position to permit them to be pushed directly into embracing relation with the adjacent blades 32, while others are so disposed that the extremities of their legs abut against the opposing blades. Therefore, in accordance with one form of my invention, provision is had to impart independent rotation to the individual pins on their longitudinal axes and simultaneously urge them toward the adjacent blades during their downward travel in the transfer wheel. Simple and efficient means for this purpose comprises a shoe 33 faced with rubber 34, or other suitable frictional material, adapted to bear upon the clothespins while they are being carried by the wheel after leaving the hopper. The shoe is provided with suspension arms 35 which are affixed to a pivot shaft 36 on the adjacent side of the hopper, which shaft is preferably provided with a weight (or spring) loaded arm 37 operative to maintain the face of the shoe in frictional contact with the opposing clothespins, thus tending to impart independent rotation to the latter in their downward travel. Mounted adjacent the end of the transfer wheel from which the heads of the pins project, is a resilient cam segment 38 with which the heads of the successive clothespins contact while they are under the independent rotary influence of the friction shoe, which segment is formed and arranged to urge the clothespins longitudinally toward the opposite end of the transfer wheel.

In the independent partial rotation of the clothespins by the friction shoe their forked ends are at once caused to pass and escape the opposing ends of the blades, whereupon the action of the segment on the heads of the clothespins urges them longitudinally into embracing relation with the blades. This done, the clothespins escape the shoe and their heads ride against a lower fixed cam segment 39 which completes the movement of the clothespins longitudinally of the grooves of the transfer wheel. The end of the wheel adjacent the blades 32 is provided with an annulus 40 which serves as an end wall for the grooves 22 and prevents endwise displacement of the forked ends of the pins.

The lower segment 39 is rigidly affixed to the adjacent standard 24, as at 41, and the upper segment 38 is pivoted to the top of the segment 39, as at 42, the upper segment thus being movable within limits toward and from the adjacent end of the transfer wheel. The segment 38 is normally pressed toward the wheel by means of a suitably-disposed spring 43, so as to present a yielding surface to the opposing pins. In the present instance the upper end of this segment 38 is provided with a lateral stud 44 which loosely extends through a perforated bracket 45 depending from the hopper, the spring 43 encircling the pin and pressing against the segment and the bracket. If desired the segment 38 may be merely a spring plate affixed to the segment 39 or other fixture, but I prefer the construction described.

Suitable guard members are arranged adjacent the down going side of the periphery of the transfer wheel so as to span the clothespins and maintain them in their grooves during the passage of the pins from the hopper to the guide structure 11. In the present instance these members comprise arcuate metal strips 46 secured at their lower end, as at 47, to the guide structure.

In Figs. 5, 6, and 7 of the drawings is shown a modification of the means for independently rotating and longitudinally moving the clothespins which are seated in the grooves of the transfer wheel. In this form each succeeding clothespin borne by the transfer wheel is rotated by a friction disk 340 at an interval of rest of the wheel. The disk is fast on a transverse shaft 48 having its axis parallel to and in the same horizontal plane as the axis of the shaft 23 of the transfer wheel, the former shaft having its bearings in spaced standards adjacent the down going side of the wheel. One of these standards is indicated at 49. Also fast on the shaft 48 is a disk 50 having a facial cam projection 370 rotatable in the path of the heads of the clothespins. A sector gear 51 likewise fast on the shaft 48 meshes with a similar gear 52 fixed on the rock arm 27.

The parts just described are so constructed and co-operatively arranged that in the downward stroke of the rock arm 27 and its pawl 26 when the transfer wheel is being advanced, a clothespin borne by the wheel is positioned in the path of the friction disk 340, the co-acting sector gears thus partially turning the shaft 48 in a clock-wise direction, as viewed in Fig. 5. In this movement of the shaft 48 the disks 340 and 50 are partially rotated, the cam portion 370 of the latter being positioned away from the path of the head of the clothespin as the latter approaches, as seen in Fig. 7. In the next succeeding upstroke of the pawl, while the transfer wheel is at rest, the co-acting sector gears partially rotate the shaft 48 in a contra-clockwise direction, thus correspondingly rotating the disks 340, 50. Coincidentally the disk 340 partially rotates the opposing clothespin, the cam portion 370 of the disk bearing against the head of the clothespin in a manner to urge the latter longitudinally of the groove and into embracing relation with the opposing blade 32, as seen in Fig. 6. In the next step of the transfer wheel, the pin is fully entered in the groove by the contact of its head with a fixed cam segment.

In Figs. 8 and 9 of the drawings I have shown another modification wherein a continuously rotating spirally-ribbed roll 341 of rubber, or other suitable friction material, is arranged to bear upon each succeeding clothespin while the transfer wheel is at rest, as in the previous modification. This roll is fast on a shaft 53 having its bearings in the upper ends of a pair of swinging arms 54 which are pivoted to basal brackets 55, and a spring 56 which is affixed to one of the arms and the adjacent standard 24 tends normally to urge the arms and perforce the roll 341 toward the transfer wheel 21, thus maintaining the roll yieldingly in the path of each succeeding clothespin as it is being carried downward from the hopper by the wheel. Fast on one end of the shaft 53 is a sheave 57 about which passes a belt 58 which may be driven from a suitable sheave on the main shaft of the machine. In its rapid rotation the spiral rib 342 of the roll 341 simultaneously rotates each succeeding opposing clothespin and urges it longitudinally into embracing relation with the blade 32 at the forked end of the pin.

It is to be understood that my invention is not limited to the particular constructions and organizations herein disclosed, as the same may be variously modified without departure from the fair spirit of the invention and the scope of the appended claims. Thus, for example, in one aspect of the invention, each positioning member may be moved longitudinally instead of the partially rotating pin, in order to interlock such member with the slot of the pin; and, in another aspect of the invention, each positioning member may be resiliently arranged to enter the slot of the partially rotating clothespin, transversely instead of longitudinally of the latter.

This application has been substituted for my application Serial No. 341,355, filed February 20, 1929.

I claim:

1. The combination of a movable transfer element including a clothespin support and a positioning member carried by the element in opposed relation to the bifurcated portion of a clothespin seated on such support, and means for imparting independent rotary motion to the clothespin about its longitudinal axis while on such element and effecting a relative interlocking movement between the bifurcated portion of the clothespin and the positioning member.

2. The combination of a movable transfer element including a clothespin support and a positioning member carried by the element in opposed relation to the bifurcated end of a clothespin seated on such support, means for imparting independent rotary motion to the clothespin while on such element and for effecting a relative movement between the clothespin and the positioning member longitudinally of the clothespin.

3. The combination of a travelling element having a succession of receptacles for individual clothespins, each receptacle having a positioning member in opposed relation to the bifurcated portion of a clothespin contained in the receptacle, and means for imparting independent rotary motion to each succeeding clothespin about its longitudinal axis and effecting a relative interlocking movement between the bifurcated portion of the clothespin and the adjacent positioning member.

4. The combination with a guide structure for forked clothespins, and means for advancing clothespins in said structure, of mechanism for successively delivering clothespins to and longitudinally of said structure, said mechanism comprising a movable transfer element having a succession of receptacles arranged and adapted to support individual clothespins, and a positioning member for the forked portion of the clothespin, means for actuating the said element and the clothespin-advancing means in timed relation, means for supplying a clothespin to each succeeding receptacle with the forked portion adjacent its positioning member, and means for imparting independent rotary motion to each succeeding clothespin about its longitudinal axis and effecting a relative interlocking movement between the fork of the clothespin and the positioning member preparatory to the delivery of the clothespin to the guide structure.

5. The combination with a guide structure for forked clothespins, and means for advancing clothespins in said structure, of mechanism for successively delivering clothespins to and longitudinally of said structure, said mechanism comprising an intermittently rotatable wheel having its axis of rotation parallel with the guide structure and having a succession of peripheral receptacles arranged and adapted to support individual clothespins parallel with the axis of the wheel, a positioning member for each receptacle, means for actuating the wheel and the clothespin-advancing means in timed relation, means for supplying a clothespin to each succeeding receptacle with the forked portion of the clothespin adjacent its positioning member, and means for imparting independent rotary motion to each succeeding clothespin about its longitudinal axis and effecting a relative interlocking movement between the fork of the clothespin and the positioning member preparatory to the delivery of the clothespin to the guide structure.

6. The combination of a rotary element including a clothespin supporting portion having a positioning member in opposed relation to the bifurcated end of a clothespin seated on such portion, means for imparting independent rotary motion to the clothespin about its longitudinal axis and simultaneously urging the pin longitudinally toward and into embracing relation with the said positioning member.

7. The combination of a rotary element including clothespin supporting portions having a positioning member in opposed relation to the bifurcated end of a clothespin seated on each such portion, and means for moving said pin to effect the embracing relation of its bifurcated end with the positioning member, said means including a member operative to impart rotary motion to the pin about its longitudinal axis, and a member operative to urge the pin longitudinally toward the positioning member.

8. The combination of an element including a clothespin supporting portion having a positioning member in opposed relation to the bifurcated end of a clothespin seated on such portion, and means for moving said pin to effect the embracing relation to its bifurcated end with the positioning member, said means including a member operative to impart rotary motion to the pin about its longitudinal axis, and a member operative against the head of the pin to urge the pin longitudinally toward the positioning member.

9. The combination of an element including a clothespin supporting portion having a positioning member in opposed relation to the bifurcated end of a clothespin seated on such portion, a frictional contact member operative to impart independent rotary motion to the pin about the longitudinal axis of the pin, and a member operative against the head of the pin to urge the pin longitudinally toward and into embracing relation with the positioning member.

10. The combination of an element including a clothespin supporting portion having a positioning member in opposed relation to the bifurcated end of a clothespin seated on such portion, a frictional contact member operative upon the pin for imparting rotary motion thereto about its longitudinal axis, and a resilient pressure member operative against the head of the pin to urge the pin longitudinally toward and into embracing relation with the positioning member.

11. The combination of a travelling element having a succession of receptacles for individual clothespins, each receptacle having a positioning member in opposed relation to the bifurcated end of a clothespin contained in the receptacle, and means for imparting independent rotary motion to the succeeding pins about their longitudinal axes and simultaneously therewith longitudinally urging the pins toward and into embracing relation with the adjacent positioning members.

12. The combination of a travelling element having a succession of receptacles for individual clothespins, each receptacle having a positioning member arranged in opposed relation to the bifurcated end of a clothespin contained in the receptacle, means for moving said pins to effect the embracing relation of their bifurcated ends with the adjacent positioning member, said means including a member operative upon the pins to impart independent rotary motion thereto about their longitudinal axes during the travel of said element, and a member operative to move the pins longitudinally toward the adjacent positioning members.

13. The combination of a wheel element having a succession of peripheral receptacles arranged and adapted to support individual clothespins longitudinally of the axis of rotation of the wheel, a positioning member in each receptacle, means for supplying a clothespin to each succeeding receptacle with the forked end of the pin in proximity to the positioning member, and means for imparting independent rotary motion to said pins about their longitudinal axes and simultaneously urging them longitudinally toward and into embracing relation with the adjacent positioning members.

14. The combination with a guide structure for forked clothespins, and means for advancing clothespins in said structure, of mechanism for successively delivering clothespins to and longitudinally of said structure, said mechanism comprising a movable transfer element having a succession of receptacles arranged and adapted to support individual clothespins, each receptacle having a positioning member for the forked end of a clothespin, means for actuating the said element and the clothespin-advancing means in timed relation, means for supplying a clothespin to each succeeding receptacle with the forked end of the pin adjacent the positioning member, and means for imparting independent rotary motion to the pins about their longitudinal axes and simultaneously urging the pins longitudinally toward and into embracing relation with the adjacent positioning members preparatory to the successive delivery of the pins to the guide structure.

15. The combination with a guide structure for forked clothespins, and means for advancing clothespins in said structure, of mechanism for successively delivering clothespins to and longitudinally of said structure, said mechanism comprising an intermittently rotatable wheel having its axis of rotation parallel to the guide structure and having a succession of peripheral receptacles arranged and adapted to support individual clothespins parallel with the axis of the wheel, a positioning member for each receptacle, means for actuating the wheel and the clothespin-advancing means in timed relation, means for supplying a clothespin to each succeeding receptacle with the forked end of the pin in proximity to the positioning member, and means for imparting independent rotary motion to the pins about their longitudinal axes and simultaneously urging the pins longitudinally toward and into embracing relation with the adjacent positioning members preparatory to the successive delivery of the pins to the guide structure.

16. The combination with a guide structure for forked clothespins, and means for advancing clothespins in said structure, of mechanism for successively delivering clothespins to and longitudinally of said structure, said mechanism comprising an intermittently rotatable wheel having its axis of rotation parallel to the guide structure and having a succession of peripheral receptacles arranged and adapted to support individual clothespins parallel to the axis of the wheel, a positioning member for each receptacle, means for actuating the wheel and the clothespin-advancing means in timed relation, means for supplying a clothespin to each succeeding receptacle with the forked end of the pin in proximity to the positioning means, a frictional member arranged in the path of the clothespins borne by the wheel and operative to impart independent rotary motion to the pins, and a pressure member operative against the heads of the pins to urge them longitudinally toward and into embracing relation with the positioning members preparatory to the successive delivery of the pins to the guide structure.

17. The combination with a transfer element for forked clothespins, comprising a carrier having a succession of receptacles arranged and adapted to receive and support clothespins in spaced parallel relation and a positioning member in each receptacle arranged and adapted to be embraced by the legs of the contained pin, of means for supplying clothespins to the respective receptacles, and means whereby the forked end of the pin in each receptacle is positioned 18. A transfer element for clothespins, comprising a carrier having a succession of receptacles arranged and adapted to receive and support clothespins in spaced parallel relation, each of said receptacles having a positioning member adapted to be embraced by the legs of the contained pin.

19. A transfer element for clothespins, comprising a wheel having a succession of peripheral receptacles arranged and adapted to support individual clothespins longitudinally of the axis of rotation of the wheel, each of said receptacles having at one end a positioning member adapted to be embraced by the legs of the contained pin.

20. A transfer element for clothespins, comprising a carrier having a succession of receptacles arranged and adapted to receive and support clothespins in spaced parallel relation, each of said receptacles having a positioning member adapted to be embraced by the legs of the contained pin, means for moving the carrier, and a single means for rotating the successive pins in their receptacles and for moving them toward the positioning member therein.

21. A transfer element for clothespins, comprising a wheel having a succession of peripheral receptacles arranged and adapted to support individual clothespins longitudinally of the axis of rotation of the wheel, each of said receptacles having at one end a positioning member adapted to be embraced by the legs of the contained pin, means for moving the carrier, and a single means for rotating the successive pins in their receptacles and for moving them toward the positioning member therein.

22. A transfer element for clothespins, comprising a carrier having a succession of receptacles arranged and adapted to receive and support clothespins in spaced parallel relation, each of said receptacles having a positioning member adapted to be embraced by the legs of the contained pin, means for moving the carrier, and rotary means for rotating the successive pins in their receptacles and for moving them toward the positioning member therein.

23. A transfer element for clothespins, comprising a carrier having a succession of receptacles arranged and adapted to receive and support clothespins in spaced parallel relation, each of said receptacles having a positioning member adapted to be embraced by the legs of the contained pin, means for moving the carrier, a spiral roll for rotating the successive pins in their receptacles and for moving them toward the positioning member, and means for rotating the spiral roll.

24. Feeding means for delivering clothespins in a predetermined position to a reinforcing wire applying station from a source of supply, comprising a transfer element arranged to receive the pins broadside, means for moving the transfer element, means for positioning the slots in the pins in a predetermined position on the transfer element, and means for moving the pins endwise to the wire applying station.

25. Feeding means for delivering clothespins in a predetermined position to a reinforcing wire applying station from a source of supply, comprising means for moving the pins broadside from the source of supply, means for then moving the pins successively in an endwise manner to the wire applying station, and means for positioning the legs in a predetermined manner during their movement from one station to the other.

26. Feeding means for delivering clothespins in a predetermined position to a reinforcing wire applying station from a source of supply, comprising a transfer element arranged to receive the pins broadside, means for moving the transfer element, means for positioning the slots in the pins in a predetermined position on the transfer element, means for engaging said slots and means for moving said pins longitudinally over said slot engaging means, and means for moving the pins endwise to the wire applying station.

Signed at New York in the county and State of New York this 19th day of March A. D. 1930.

JOHN R. NOLAN.